United States Patent
Sugimoto et al.

(10) Patent No.: US 11,634,597 B2
(45) Date of Patent: Apr. 25, 2023

(54) METHOD FOR FORMING MULTILAYER COATING FILM

(71) Applicants: NIPPON PAINT AUTOMOTIVE COATINGS CO., LTD., Hirakata (JP); TOYOTA JIDOSHA KABUSHIKI KAISHA, Toyota (JP)

(72) Inventors: Katsuhiko Sugimoto, Hirakata (JP); Masako Hase, Toyota (JP); Hiroshi Mitsuishi, Nagoya (JP); Keiji Ambo, Miyoshi (JP)

(73) Assignees: NIPPON PAINT AUTOMOTIVE COATINGS CO., LTD., Hirakata (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 476 days.

(21) Appl. No.: 16/716,892

(22) Filed: Dec. 17, 2019

(65) Prior Publication Data

US 2020/0199378 A1    Jun. 25, 2020

(30) Foreign Application Priority Data

Dec. 21, 2018    (JP) .............................. JP2018-240069

(51) Int. Cl.
| | |
|---|---|
| *B05D 7/00* | (2006.01) |
| *C09D 5/36* | (2006.01) |
| *C09D 7/40* | (2018.01) |
| *C09D 175/14* | (2006.01) |
| *C09D 179/08* | (2006.01) |

(52) U.S. Cl.
CPC ............... *C09D 5/36* (2013.01); *B05D 7/572* (2013.01); *C09D 7/70* (2018.01); *C09D 175/14* (2013.01); *C09D 179/08* (2013.01)

(58) Field of Classification Search
None
See application file for complete search history.

(56) References Cited

U.S. PATENT DOCUMENTS

| | | | |
|---|---|---|---|
| 9,376,574 B2 | 6/2016 | Hayashi et al. | |
| 2002/0136911 A1* | 9/2002 | Yamamoto | C09D 5/4473 428/500 |
| 2009/0171016 A1* | 7/2009 | Sato | C08K 5/29 564/252 |
| 2009/0274846 A1* | 11/2009 | Wada | C09D 175/04 427/407.1 |
| 2016/0083617 A1 | 3/2016 | Koyama et al. | |
| 2018/0281019 A1 | 10/2018 | Kawabata et al. | |

FOREIGN PATENT DOCUMENTS

| | | | |
|---|---|---|---|
| JP | 2009-262001 A | 11/2009 | |
| JP | 2014-210225 A | 11/2014 | |
| JP | 2018-171593 A | 11/2018 | |
| WO | WO-2007119305 A1 * | 10/2007 | ......... C08G 18/3206 |

OTHER PUBLICATIONS

Communication dated Jun. 1, 2022 from China National Intellectual Property Administration in corresponding Chinese Application No. 201911317309.2.

* cited by examiner

*Primary Examiner* — Shamim Ahmed
*Assistant Examiner* — Bradford M Gates
(74) *Attorney, Agent, or Firm* — Sughrue Mion, PLLC

(57) ABSTRACT

A method for forming a multilayer coating film which includes forming an uncured coating film by applying a first aqueous base coating composition, forming an uncured coating film by applying a second aqueous base coating composition, forming an uncured coating film by applying a clear coating composition, and simultaneously heat curing the obtained coating films. The first aqueous base coating composition contains a carbodiimide compound, the clear coating composition contains a hydroxyl group-containing acrylic resin (A) having a hydroxyl value of 120 to 160 mgKOH/g and an acid value of 5 to 10 mgKOH/g, a polyisocyanate compound (B), and a polycarbonate diol compound (C). The component (A) has a hydroxyl group-containing alkyl moiety having 3 or less carbon atoms, and the ratio of the numbers of moles of the isocyanate functional groups of the component (B) and the hydroxyl group functional groups of the component (A) is 1.15 to 1.35.

4 Claims, No Drawings

METHOD FOR FORMING MULTILAYER COATING FILM

CROSS REFERENCE TO RELATED APPLICATION

This application claims the benefit of priority to Japanese Patent Application No. 2018-240069, filed on Dec. 21, 2018, the entire disclosure of which is hereby incorporated by reference in its entirety.

FIELD OF THE INVENTION

The present invention relates to a method for forming a multilayer coating film.

DESCRIPTION OF RELATED ART

On the surface of an object to be coated such as an automobile body is formed sequentially a plurality of coating films having various roles, and thus the object to be coated is protected and concurrently is provided with a beautiful appearance and an excellent design. A common method for forming such a plurality of coating films, for example, for a steel plate is a method in which an undercoating film such as an electrodeposited coating film is formed on an object to be coated that is excellent in conductivity, and then an intermediate coating film, a base coating film, and a clear coating film are formed thereon one after another. Previously, such three-layer laminated coating films composed of an intermediate coating film, a base coating film, and a clear coating film were formed by repeating of applying and then baking and curing each coating film one after another.

However, in order to achieve energy savings that have been particularly demanded in recent years, and to further improve work efficiency, in the coating of automobile bodies, methods for forming a multilayer coating film in which a plurality of coating compositions are applied one on another in an uncured state, and then they are cured simultaneously, for example, a three-coating-one-baking method including a step of simultaneously baking and curing an intermediate coating film, a base coating film, and a clear coating film, have been gradually adopted. Such a method for forming a coating film including a reduced number of baking and curing is not necessarily an ideal method for forming a multilayer coating film, and possibly affects the coating film appearance due to mixing or joining between the layers and physical or chemical changes during curing. On the other hand, even in the multilayer coating film formation by such a three-coating-one-baking method, there has been demanded a coating film appearance equivalent to that of a multilayer coating film formed by baking and curing each time when a coating composition is applied.

Incidentally, a clear coating film constituting the uppermost layer of a multilayer coating film may be scratched on the coating film surface, for example, by contact with a brush or the like during car washing. Therefore, the clear coating film is required to have excellent scratch resistance.

JP-A-2014-210225 discloses a method for forming a multilayer coating film including: an intermediate coating film forming step of forming an intermediate coating film on an electrodeposition-cured coating film by applying an aqueous intermediate coating composition, a base coating film forming step of forming a base coating film onto the intermediate coating film by applying an aqueous base coating composition, a clear coating film forming step of forming a clear coating film onto the uncured base coating film by applying a clear coating composition, and a heat curing step of simultaneously heat curing these three coating films. In JP-A-2014-210225, there is further disclosed an embodiment in which the clear coating composition is a clear coating composition containing an acrylic resin and a polyisocyanate compound, wherein the acrylic resin has structural units (a) based on ε-caprolactone and structural units (b) based on a radically polymerizable monomer having a ring structure, and the content ratio of the structural units (a) and the content ratio of the structural units (b) is within a specific range. In addition, the method for forming a multilayer coating film by the 3C1B (three-coating-one-baking) system disclosed in JP-A-2014-210225 is described to be capable of affording a multilayer coating film having a superior coating film appearance, being superior in chipping resistance and coating film hardness, and satisfying scratch resistance, water resistance, acid resistance, and the like.

SUMMARY OF THE INVENTION

In the method for forming a multilayer coating film in JP-A-2014-210225, scratch resistance is improved by adjusting the content ratio of the constituent units of ε-caprolactone and the constituent units of a radically polymerizable monomer having a ring structure contained in the clear coating composition (paragraphs[0056],[0057], etc.). On the other hand, since there are various formulations of the clear coating composition, means other than improving the scratch resistance using the above-mentioned specific resin is also still needed.

The present invention solves such a technical problem, and an object thereof is to provide a method of forming a multilayer coating film having a clear coating film superior in scratch resistance and having a superior coating film appearance.

The present invention provides the following aspects to solve the aforementioned problems.

[1] A method for forming a multilayer coating film, the method including:

a first aqueous base coating step of forming an uncured first base coating film on an automobile body with an electrodeposited coating film by applying a first aqueous base coating composition such that a dry coating film thickness of 10 to 40 μm is achieved;

a second aqueous base coating step of forming an uncured second base coating film on an uncured coating film obtained by drying, at 60 to 90° C., the uncured first base coating film obtained in the above step by applying a second aqueous base coating composition such that a dry coating film thickness of 5 to 30 μm is achieved;

a clear coating step of heat drying the uncured first base coating film and the uncured second base coating film obtained in the above steps and then forming an uncured clear coating film by applying a clear coating composition such that a dry coating film thickness of 10 to 70 μm is achieved; and a curing step of forming a multilayer coating film composed of a first base coating film, a second base coating film, and a clear coating film by simultaneously heat curing the uncured first base coating film, the uncured second base coating film and the uncured clear coating film obtained in the above steps, in which the first aqueous base coating composition contains a carbodiimide compound represented by following general formula (1),

[Chemical Formula 1]

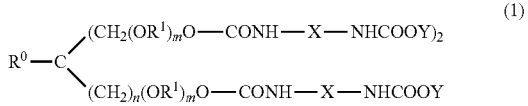

in formula (1),

X each independently represents a bifunctional organic group containing at least one carbodiimide group, Y each independently represents a structure obtained by removing a hydroxyl group from a polyalkylene glycol monoalkyl ether, $R^0$ represents hydrogen or an alkyl group having 2 or less carbon atoms, $R^1$ each independently represents an alkylene group having 4 or less carbon atoms, m each independently represents a number of 11 or more, n represents 0 or 1, and a repeat number of the oxyalkylene groups in the polyalkylene glycol monoalkyl ether is 6 to 40, wherein the clear coating composition is a clear coating composition containing a hydroxyl group-containing acrylic resin (A), a polyisocyanate compound (B) and a polycarbonate diol compound (C), the hydroxyl group-containing acrylic resin (A) has a hydroxyl value in a range of 120 to 160 mgKOH/g, and has an acid value in a range of 5 to 10 mgKOH/g, the hydroxyl group-containing acrylic resin (A) is a solution polymerized body of a monomer mixture containing a (meth)acrylic acid hydroxyl group-containing alkyl ester monomer, and a hydroxyl group-containing alkyl moiety of the (meth)acrylic acid hydroxyl group-containing alkyl ester monomer has 3 or less carbon atoms, and a ratio of numbers of moles of isocyanate functional groups of the polyisocyanate compound (B) and hydroxyl group functional groups of the hydroxyl group-containing acrylic resin (A) (isocyanate functional groups/hydroxyl group functional groups) is in a range of 1.15 to 1.35.

[2] The method, in which the second aqueous base coating composition contains a scale-like luster pigment.

[3] The method, in which the polyisocyanate compound (B) is at least one species selected from the group consisting of aliphatic diisocyanates, alicyclic diisocyanates, and nurate bodies and uretdione bodies of these diisocyanates.

The multilayer coating film formed by the above-described method for forming a multilayer coating film has an excellent coating film appearance and further has good scratch resistance. The method for forming a multilayer coating film of the present invention can be particularly suitably used in, for example, coating of automobile bodies.

DETAILED DESCRIPTION OF PREFERRED EMBODIMENTS

The method for forming a multilayer coating film includes:

a first aqueous base coating step of forming an uncured first base coating film on an automobile body with an electrodeposited coating film by applying a first aqueous base coating composition such that a dry coating film thickness of 10 to 40 μm is achieved;

a second aqueous base coating step of forming an uncured second base coating film on an uncured coating film obtained by drying, at 60 to 90° C., the uncured first base coating film obtained in the above step by applying a second aqueous base coating composition such that a dry coating film thickness of 5 to 30 μm is achieved;

a clear coating step of heat drying the uncured first base coating film and the uncured second base coating film obtained in the above steps and then forming an uncured clear coating film by applying a clear coating composition such that a dry coating film thickness of 10 to 70 μm is achieved; and a curing step of forming a multilayer coating film composed of a first base coating film, a second base coating film, and a clear coating film by simultaneously heat curing the uncured first base coating film, the uncured second base coating film and the uncured clear coating film obtained in the above steps. Hereinafter, the coating compositions to be used in the respective steps are described in detail.

First Aqueous Base Coating Composition

The first aqueous base coating composition to be used in the method for forming a multilayer coating film contains a coating film-forming resin to form a coating film. The coating film-forming resin contained in the first aqueous base coating composition is required to contain a carbodiimide compound.

Coating Film-Forming Resin

The coating film-forming resin contained in the first aqueous base coating composition contains, for example, an acrylic resin emulsion and a curing agent containing a carbodiimide compound in a state where they are dispersed or dissolved in an aqueous medium. The coating film-forming resin preferably further contains at least one resin selected from among polyester resins, polyurethane resins and polycarbonate resins in addition to the acrylic resin emulsion. Moreover, the curing agent contained in the coating film-forming resin preferably further contains a melamine resin, a blocked isocyanate compound, etc. in addition to the carbodiimide compound.

Acrylic Resin Emulsion

The acrylic resin emulsion may preferably be prepared, for example, by emulsion polymerizing a monomer mixture containing a (meth)acrylic acid alkyl ester monomer, an acid group-containing ethylenically unsaturated monomer, a hydroxyl group-containing ethylenically unsaturated monomer, and a styrenic monomer.

In the preparation of the acrylic resin emulsion, the main skeleton of the acrylic resin is constituted by containing the (meth)acrylic acid alkyl ester monomer in the monomer mixture. Examples of the (meth)acrylic acid alkyl ester monomer include methyl (meth)acrylate, ethyl (meth)acrylate, propyl (meth)acrylate, n-butyl (meth)acrylate, isobutyl (meth)acrylate, t-butyl (meth)acrylate, hexyl (meth)acrylate, 2-ethylhexyl (meth)acrylate, octyl (meth)acrylate, nonyl (meth)acrylate, decyl (meth)acrylate, dodecyl (meth)acrylate, and stearyl (meth)acrylate.

The content of the (meth)acrylic acid alkyl ester monomer may preferably be 50 to 98% by mass, more preferably 65 to 96% by mass, based on the total amount of the monomer mixture to be used for the synthesis of the acrylic resin emulsion. The (meth)acrylic acid alkyl ester monomer may be used singly, or two or more species thereof may be used in combination.

In the present description, (meth)acryl represents acryl and/or methacryl.

The acid group-containing ethylenically unsaturated monomer is used for improving various types of stability of a resulting acrylic resin emulsion, such as storage stability, mechanical stability, and stability against freezing, and accelerating a curing reaction with a curing agent during the formation of a coating film. The acid group may preferably be selected from among a carboxyl group, a sulfonic acid group, and a phosphoric acid group. A particularly preferable acid group is a carboxyl group from the viewpoints of the above-mentioned improvement in various types of stability and the function of accelerating a curing reaction.

Examples of a carboxyl group-containing ethylenically unsaturated monomer, which is one of the acid group-containing ethylenically unsaturated monomers, include acrylic acid, methacrylic acid, crotonic acid, isocrotonic acid, ethacrylic acid, propylacrylic acid, isopropylacrylic acid, itaconic acid, maleic anhydride, and fumaric acid. Examples of a sulfonic acid group-containing ethylenically unsaturated monomer, which is one of the acid group-containing ethylenically unsaturated monomers, include p-vinylbenzenesulfonic acid, p-acrylamidopropanesulfonic acid, and t-butylacrylamidosulfonic acid. Examples of a phosphoric acid group-containing ethylenically unsaturated monomer, which is one of the acid group-containing ethylenically unsaturated monomers, include LIGHT ESTER PM (manufactured by Kyoeisha Chemical Co., Ltd.), etc., such as a phosphoric acid monoester of 2-hydroxyethyl acrylate and a phosphoric acid monoester of 2-hydroxypropyl methacrylate.

The content of the acid group-containing ethylenically unsaturated monomer may preferably be 0.1 to 5% by mass, more preferably 0.1 to 3% by mass, based on the total amount of the monomer mixture to be used for the synthesis of the acrylic resin emulsion. The acid group-containing ethylenically unsaturated monomer may be used singly, or two or more species thereof may be used in combination.

The above-mentioned hydroxyl group-containing ethylenically unsaturated monomer is used in order to impart hydrophilicity based on hydroxyl groups to the acrylic resin emulsion, increase workability and stability against freezing when used as a coating composition, and impart cure reactivity with a curing agent.

The content of the hydroxyl group-containing ethylenically unsaturated monomer may preferably be 1.0 to 32% by mass, more preferably 1.0 to 30% by mass, based on the total amount of the monomer mixture to be used for the synthesis of the acrylic resin emulsion. The hydroxyl group-containing ethylenically unsaturated monomer may be used singly or two or more species thereof may be used in combination.

Examples of the hydroxyl group-containing ethylenically unsaturated monomer include 2-hydroxyethyl (meth)acrylate, 2-hydroxypropyl (meth)acrylate, 4-hydroxybutyl (meth)acrylate, and ε-caprolactone-modified acrylic monomers.

Examples of the above-mentioned ε-caprolactone-modified acrylic monomers include "PLACCEL FA-1", "PLACCEL FA-2", "PLACCEL FA-3", "PLACCEL FA-4", "PLACCEL FA-5", "PLACCEL FM-1", "PLACCEL FM-2", "PLACCEL FM-3", "PLACCEL FM-4", and "PLACCEL FM-5" manufactured by Daicel Chemical Industries, Ltd.

Examples of the styrenic monomer include styrene, α-methylstyrene, α-methylstyrene dimer, vinyltoluene, and divinylbenzene. Of these, styrene is particularly preferable from the viewpoints of hydrophobicity, cost, and convenience in availability.

The content of the styrenic monomer may preferably be 1 to 10% by mass and more preferably 2 to 8% by mass, based on the total amount of the monomer mixture to be used for the synthesis of the acrylic resin emulsion. Containing a styrenic monomer in the monomer mixture offers an advantage that an excellent hydrophobic effect can be obtained and generation of dripping during the application of a resulting first aqueous base coating composition can be significantly suppressed.

The monomer mixture may include a cross-linkable monomer such as (meth)acrylonitrile, (meth)acrylamide, carbonyl group-containing ethylenically unsaturated monomers, hydrolytically polymerizable silyl group-containing monomers, and polyfunctional vinyl monomers as a monomer other than the above-described monomers.

Emulsion polymerization can be carried out by heating the monomer mixture in an aqueous liquid with stirring in the presence of a radical polymerization initiator and an emulsifier. The reaction temperature may preferably be about 30 to about 100° C., for example, and the reaction time may preferably be about 1 to about 10 hours, for example. The reaction temperature can be adjusted, for example, by collectively adding or gradually dropping the monomer mixture or monomer pre-emulsion to a reaction vessel charged with water and an emulsifier.

As the radical polymerization initiator, known initiators usually used in emulsion polymerization of acrylic resins can be used. Specifically, for example, persulfates such as potassium persulfate, sodium persulfate, and ammonium persulfate can be used in the form of an aqueous solution as a water-soluble free radical polymerization initiator. In addition, a so-called redox initiator containing a combination of an oxidizing agent such as potassium persulfate, sodium persulfate, ammonium persulfate and hydrogen peroxide and a reducing agent such as sodium bisulfite, sodium thiosulfate, Rongalite and ascorbic acid can be used in the form of an aqueous solution.

As the emulsifier, an anion or nonionic emulsifier selected from among micelle compounds each having a hydrocarbon group having 6 or more carbon atoms and a hydrophilic moiety such as a carboxylate, a sulfonate or a sulfate partial ester, in one molecule can be used. Among these, examples of the anionic emulsifier include an alkali metal salt or an ammonium salt of a half ester of sulfuric acid with an alkyl phenol or a fatty alcohol; an alkali metal salt or an ammonium salt of an alkyl sulfonate or an allyl sulfonate; an alkali metal salt or an ammonium salt of a half ester of sulfuric acid with a polyoxyethylene alkylphenyl ether, a polyoxyethylene alkyl ether or a polyoxyethylene allyl ether. Examples of the nonionic emulsifier include a polyoxyethylene alkylphenyl ether, a polyoxyethylene alkyl ether, or a polyoxyethylene allyl ether. Besides such general-purpose anionic and nonionic emulsifiers, various anionic or nonionic, reactive emulsifiers each having, in its molecule, a radically polymerizable unsaturated double bond-containing group, such as an acrylic group, a methacrylic group, a propenyl group, an allyl group, an allyl ether group, a maleic group can be used singly or in combination of two or more species thereof.

Moreover, in emulsion polymerization, the combined use of an auxiliary agent (a chain transfer agent) for molecular weight adjustment such as mercaptan compounds and lower alcohols may be preferable in many cases from the viewpoint of promoting emulsion polymerization and from the viewpoint of promoting smooth and uniform formation of a coating film to improve the adhesion to a substrate, and it is appropriately carried out according to the situation.

As the emulsion polymerization, there can be used any polymerization method, such as a conventional single-stage continuous uniform dropwise monomer addition method; a core-shell polymerization method that is a multi-stage monomer feeding method; and a power feed polymerization method wherein formulation of the monomers to be fed is continuously altered during polymerization.

The weight-average molecular weight of the acrylic resin is not particularly limited, but may preferably be about 50,000 to about 1,000,000, and more preferably about 100,000 to about 800,000. The glass transition temperature (Tg) of the acrylic resin may preferably be in the range of −50° C. to 20° C., and more preferably in the range of −30° C. to 20° C.

In the present description, the number-average molecular weight and the weight-average molecular weight can be determined by gel permeation chromatography (GPC) using a polystyrene standard sample.

The acid value of the acrylic resin may preferably be in the range of 2 to 60 mgKOH/g, and more preferably in the range of 3 to 50 mgKOH/g. The hydroxyl value of the acrylic resin may preferably be in the range of 10 to 120 mgKOH/g, and more preferably in the range of 10 to 70 mgKOH/g. The adjustment of the acid value and the hydroxyl value of an acrylic resin can be adjusted by using the hydroxyl group-containing monomer and the acid group-containing monomer for use in the preparation of the acrylic resin in amounts that satisfy the requirements for the hydroxyl value and the acid value.

In order to maintain the stability of the obtained acrylic resin emulsion by neutralizing a part or the whole of the carboxylic acid, a basic compound may be added to the acrylic resin emulsion. As such a basic compound, ammonia, various amines, and alkali metals can be usually used, and these can be appropriately used in the present invention.

The resin solid content of the acrylic resin emulsion contained in 100 parts by mass of the total resin solid content of the coating film-forming resin may preferably be 20 to 50 parts by mass, and more preferably 20 to 40 parts by mass. The condition that the solid content of the acrylic resin emulsion contained in the coating film-forming resin is in the above range offers the advantage that various stability, such as storage stability, mechanical stability, and stability against freezing, of the first aqueous base coating composition are improved and the curing reaction with the curing agent during coating film formation sufficiently occurs, so that various strengths, chipping resistance, and water resistance of the resulting coating film improve.

Herein, the total resin solid content of the coating film-forming resin in an embodiment including a curing agent, etc. means the total solid content of the main binder resin such as an acrylic resin and the curing agent.

Polyester Resin

The coating film-forming resin in the first aqueous base coating composition may include a polyester resin as necessary. As the polyester resin, a resin usually used in this technical field can be used. The polyester resin may preferably be a hydroxyl group-containing polyester resin. The condition that the coating film-forming resin in the first aqueous base coating composition includes the polyester resin offers the advantage that the viscosity of the coating film after coating is maintained appropriately and an excellent appearance can be obtained.

The solid content of the polyester resin contained in 100 parts by mass of the total resin solid content of the coating film-forming resin may preferably be 0 to 55 parts by mass, and more preferably 5 to 30 parts by mass.

Examples of the hydroxyl group-containing polyester resin include an oil-free polyester resin obtained by condensing a polyhydric alcohol component and a polybasic acid component, or an oil-modified polyester resin obtained by adding, in addition to the polyhydric alcohol component and the polybasic acid component, an oil component that is one species or a mixture of two or more species selected from among castor oil, dehydrated castor oil, wood oil, safflower oil, soy oil, linseed oil, tall oil, coconut oil, and their fatty acids to the acid component and the alcohol component, followed by reacting other components. Further, polyester resins grafted with an acrylic resin or a vinyl resin can also be used. Further, a urethane-modified polyester resin obtained by reacting a polyisocyanate compound with a polyester resin obtained by reacting a polyhydric alcohol component and a polybasic acid component can also be used.

The number-average molecular weight (Mn) of the hydroxyl group-containing polyester resin may preferably be 800 to 10,000, and more preferably 1,000 to 8,000. The hydroxyl value of the hydroxyl group-containing polyester resin may preferably be 35 to 170 mgKOH/g, and more preferably 50 to 150 mgKOH/g. The hydroxyl group-containing polyester resin preferably has an acid value of 15 to 100 mgKOH/g, and more preferably has an acid value of 20 to 80 mgKOH/g.

The glass transition temperature of the hydroxyl group-containing polyester resin may preferably be −40 to 50° C. The glass transition temperature can be determined by calculation from the loadings of the monomers in the monomer mixture to be used for the synthesis.

Examples of the polyhydric alcohol component include diols such as ethylene glycol, diethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxypivalic acid neopentyl glycol ester, 2-butyl-2-ethyl-1,3-propanediols, 3-methyl-1,5-pentanediol, 2,2,4-trimethylpentanediol, and hydrogenated bisphenol A; trihydric or higher polyol components such as trimethylolpropane, trimethylolethane, glycerin, and pentaerythritol; and hydroxycarboxylic acid components such as 2,2-dimethylolpropionic acid, 2,2-dimethylolbutanoic acid, 2,2-dimethylolpentanoic acid, 2,2-dimethylolhexanoic acid, and 2,2-dimethyloloctanoic acid.

Examples of the polybasic acid component include polybasic acid components and anhydrides thereof including aromatic polycarboxylic acids and anhydrides thereof such as phthalic anhydride, isophthalic acid, terephthalic acid, trimellitic anhydride, tetrabromophthalic anhydride, tetrachlorophthalic anhydride, and pyromellitic anhydride; alicyclic polycarboxylic acids and anhydrides thereof such as hexahydrophthalic anhydride, tetrahydrophthalic anhydride, and 1,4- and 1,3-cyclohexanedicarboxylic acids; aliphatic polycarboxylic acids and anhydrides thereof such as maleic anhydride, fumaric acid, succinic anhydride, adipic acid, sebacic acid, and azelaic acid. A monobasic acid such as benzoic acid or tert-butylbenzoic acid may be used together, if necessary.

When preparing a polyester resin, as reaction components, monohydric alcohols, monoepoxide compounds such as Cardura E (trade name: manufactured by Shell Chemical), and lactones (β-propiolactone, dimethylpropiolactone, butyrolactone, γ-valerolactone, ε-caprolactone, γ-caprolactone, γ-caprylolactone, crotolactone, δ-valerolactone, δ-caprolactone, etc.) may be used in combination as a reaction component. In particular, lactones undergo ring-opening addition to a polyester chain of a polycarboxylic acid and a polyhydric alcohol to form a polyester chain itself and further serve to improve the chipping resistance of the first aqueous base coating composition. These may be contained in an amount of 3 to 30%, preferably 5 to 20%, in particular 7 to 15% of the total mass of all reaction components.

The hydroxyl group-containing polyester resin can be made aqueous (water-dispersed) by adjusting its acid value and neutralizing (for example, 50% or more) the carboxyl groups with a basic substance. Examples of the basic substance to be used here include ammonia, methylamine, ethylamine, dimethylamine, diethylamine, trimethylamine, triethylamine, dimethylethanolamine, diethanolamine, and triethanolamine, and among these, diethanolamine, dimethylethanolamine, and triethanolamine may be preferred. Further, the neutralization rate at the time of the above neutralization is not particularly limited, and is, for example, 80 to 120%.

Polyurethane Resin

In the present invention, the coating film-forming resin in the first aqueous base coating composition may include a polyurethane resin. As the polyurethane resin, a resin usually used in this technical field can be used. Preferably, an aqueous polyurethane resin is included. Thanks to the inclusion of a polyurethane resin in the coating film-forming resin, the flexibility of a coating film is improved and the uniformity of crosslinking can be introduced. For this reason, it offers an advantage that the chipping resistance of a coating film can be derived.

When the coating film-forming resin includes a polyurethane resin, the solid content of the polyurethane resin may preferably be 5 to 50 parts by mass, and more preferably 5 to 40 parts by mass, based on 100 parts by mass of the total resin solid content of the coating film-forming resin.

The aqueous polyurethane resin is a resin obtained by a reaction between a diisocyanate compound and a diol containing various polyol components such as acrylic, polyester, polyether, and polycarbonate, and examples thereof include a resin having urethane linkages. As for the urethane resin, for example, a resin containing a carboxyl group may be used, and the introduction of the carboxyl group may be modification of a part or all of the hydroxyl groups derived from raw materials with an acid anhydride or the like, or a case of using, as a diol component, a compound having a hydroxyl group and a carboxyl group in one molecule. The diol having a carboxyl group is not particularly limited, and preferable examples thereof include dimethylolpropionic acid.

In some embodiments, the aqueous polyurethane resin is a polyether-based polyurethane resin. Thanks to the inclusion of the polyether-based polyurethane resin, for example, the flexibility of a coating film can be further improved and the uniformity of crosslinking can be derived. For this reason, the chipping resistance of a coating film can be further improved.

Examples of the diisocyanate compound include 2,4-tolylene diisocyanate (2,4-TDI), 2,6-tolylene diisocyanate (2,6-TDI), and mixtures thereof (TDI), diphenylmethane-4,4'-diisocyanate (4,4'-MDI), diphenylmethane-2,4'-diisocyanate (2,4'-MDI), and mixtures thereof (MDI), naphthalene-1,5-diisocyanate (NDI), 3,3'-dimethyl-4,4'-biphenylene diisocyanate (TODI), xylylene diisocyanate (XDI), dicyclohexylmethane diisocyanate (hydrogenated HDI), isophorone diisocyanate (IPDI), hexamethylene diisocyanate (HDI), and hydrogenated xylylene diisocyanate (HXDI).

Polycarbonate Resin

In the present invention, the coating film-forming resin in the first aqueous base coating composition may include a polycarbonate resin. As the polycarbonate resin, a resin usually used in this technical field can be used. Preferably, a polycarbonate resin having a hydroxyl group at an end thereof is included. The inclusion of the polycarbonate resin in the coating film-forming resin offers an advantage that the coating workability of a coating film can be further improved.

The solid content of the polycarbonate resin contained in 100 parts by mass of the total resin solid content of the coating film-forming resin may preferably be 0 to 30 parts by mass, and more preferably 1 to 30 parts by mass.

Examples of the polycarbonate resin include polycarbonate resins each having a hydroxyl group at an end thereof and a number-average molecular weight of 1,000 to 10,000, preferably 2,000 to 6,000.

A preferred composition of the polycarbonate resin may be, for example, a polycarbonate resin obtained by reacting a carbonate monomer selected from among a dialkyl carbonate or ethylene carbonate with a linear dihydric alcohol, a branched dihydric alcohol, and a trihydric or higher polyhydric alcohol, wherein the branched dihydric alcohol accounts for at least 10 mol % or more of all the alcohols and 10 mol % or more of all the alcohols is accounted for by the trihydric or higher polyhydric alcohol.

Examples of the branched chain dihydric alcohol representatively include 2-methyl-1,3-propanediol, 3-methyl-1,5-pentanediol, neopentyl glycol, 2,2-diethyl-1,3-propanediol, 2-butyl-2-ethyl-1,3-propanediol, 2-methyl-1,8-octanediol, 2,2,4-trimethyl-1,3-pentanediol, 2-ethyl-1,3-hexanediol, 1,4-cyclohexanedimethanol, and tricyclodecane dimethanol.

Representative examples of the trihydric or higher polyhydric alcohol to be used for the coating composition of the present invention include glycerin, trimethylolethane, trimethylolpropane, trimethylolpropane dimer, and pentaerythritol. Examples of the linear dihydric alcohol representatively include 1,3-propylene glycol, 1,4-butanediol, 1,5-pentanediol, 1,6-hexanediol, 1,8-octanediol, 1,9-nonanediol, and 1,10-decanediol.

Carbodiimide Compound

The carbodiimide compound contained in the first aqueous base coating composition is a carbodiimide compound represented by the following formula (1),

[Chemical Formula 2]

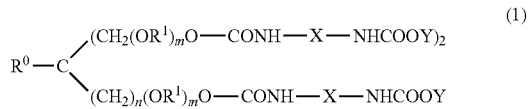

(1)

in formula (1),

X each independently represents a bifunctional organic group containing at least one carbodiimide group;

Y each independently represents a structure obtained by removing a hydroxyl group from a polyalkylene glycol monoalkyl ether, $R^0$ represent hydrogen or an alkyl group having 2 or less carbon atoms, $R^1$ each independently represents an alkylene group having 4 or less carbon atoms, m each independently represents a number of 11 or more, n represents 0 or 1, the repeat number of the oxyalkylene groups in the polyalkylene glycol monoalkyl ether is 6 to 40.

Herein, X can be represented by the following formula (a).

[Chemical Formula 3]

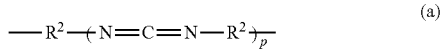

In the above formula (a), each $R^2$ may preferably be a hydrocarbon group having 6 to 15 carbon atoms. Examples thereof include a phenylene group, a diphenylenemethyl group, a diphenylene(dimethyl)methyl group, a methylphenylene group, a dimethylphenylene group, a tetramethylxylylene group, a hexylene group, a cyclohexylene group, and a dicyclohexylenemethyl group. Preferred is a dicyclohexylenemethyl group. In the above formula, p is 1 to 10. p is the number of the carbodiimide groups existing in the above structural unit, and p may preferably be 2 or more in terms of curability, and the upper limit thereof may preferably be 8 or less.

In the present description, repeat numbers, including the above p, are represented as average values.

The above Y can be represented by the following formula (b) or (c).

[Chemical Formula 4]

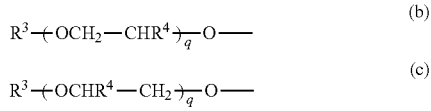

In the above formulas (b) and (c), $R^3$ may preferably be an alkyl group having 1 to 20 carbon atoms. Examples thereof include a methyl group, an ethyl group, a butyl group, a hexyl group, an octyl group, a decyl group, a dodecyl group, and a stearyl group. $R^4$ is a hydrogen atom or a methyl group, and may preferably be a hydrogen atom. q is 4 to 40. In the above formulas (b) and (c), when $R^4$ is hydrogen, the formulas (b) and (c) represent the same structure.

In the formula (1), $R^0$ is hydrogen, a methyl group, or an ethyl group. $R^1$s are each an alkylene group having 4 or less carbon atoms, and may be either identical or different. Specific alkylene groups include a methylene group, an ethylene group, a propylene group, and a butylene group. n is 0 or 1, and m is 0 to 60.

$R^0$, $R^1$, n and m are determined depending on a trifunctional polyol to be used for the production of the carbodiimide compound.

When m is 11 or more, the ratio of a hydrophilic section to a hydrophobic section may preferably be 2.0 to 6.3. The ratio of the hydrophilic section to the hydrophobic section can be determined by dividing the molecular weight of the moiety of an oxymethylene group or an oxyethylene group existing in the carbodiimide compound by the molecular weight of the carbodiimide compound.

The carbodiimide compound can be obtained by reacting a raw material carbodiimide compound having at least two isocyanate group in one molecule with a polyalkylene glycol monoalkyl ether in such a ratio that the equivalent of the isocyanate groups of the raw material carbodiimide compound is larger than the equivalent of the hydroxyl groups of the polyalkylene glycol monoalkyl ether, and further reacting the resulting reaction product with a trifunctional polyol.

From the viewpoint of reactivity, the raw material carbodiimide compound having at least two isocyanate groups in its molecule preferably has isocyanate groups at its both ends. A method for producing the raw material carbodiimide compound having isocyanate groups at its both ends is well known to those skilled in the art and, for example, a condensation reaction accompanied by a decarboxylation of an organic diisocyanate can be utilized.

As to the organic diisocyanate, specifically, aromatic diisocyanates, aliphatic diisocyanates, alicyclic diisocyanates, and mixtures thereof can be used, and specific examples thereof include 1,5-naphthylene diisocyanate, 4,4-diphenylmethane diisocyanate, 4,4-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4-diisocyanate, methylcyclohexane diisocyanate, and tetramethylxylylene diisocyanate. From the viewpoint of reactivity, dicyclohexylmethane-4,4-diisocyanate may be preferred.

A carbodiimidization catalyst can usually be used for the condensation reaction. Specific examples of the carbodiimidization catalyst include phospholene oxides such as 1-phenyl-2-phospholene-1-oxide, 3-methyl-2-phospholene-1-oxide, 1-ethyl-2-phospholene-1-oxide, 3-methyl-1-phenyl-2-phospholene-1-oxide, and 3-phospholene isomers thereof. From the viewpoint of reactivity, 3-methyl-1-phenyl-2-phospholene-1-oxide may be preferred.

As the polyalkylene glycol monoalkyl ether to be reacted with the raw material carbodiimide compound, those represented by the following formula (b') or (c') can be used.

[Chemical Formula 5]

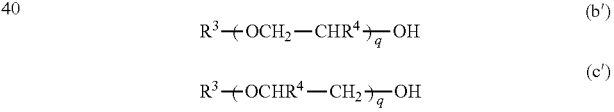

In the above formulas (b') and (c'), the contents described for $R^3$, $R^4$, and q in the preceding formulas (b) and (c) apply as they are. The type of $R^4$ and q in the above unit are set appropriately within the above ranges, respectively, in consideration of storage stability, dispersibility in water, and reactivity after volatilization of water. It may be preferable from the viewpoint of dispersibility in water that $R^3$ in the monoalkoxypolyalkylene glycol be a methyl group and $R^4$ be a hydrogen atom. Moreover, from the viewpoint of dispersibility in water and reactivity after volatilization of water, the q may preferably be 4 to 20, and more preferably 6 to 12.

As the polyalkylene glycol monoalkyl ether, a polyalkylene glycol monoalkyl ether having a number-average molecular weight of 200 to 5,000 may preferably be used. The alkyl group of the polyalkylene glycol monoalkyl ether may preferably be an alkyl group having 1 to 20 carbon atoms. Examples of the polyalkylene glycol monoalkyl ether include those composed of polyethylene glycol, polypropylene glycol, or mixtures thereof each of which is capped at one end with an alkyl group having 1 to 20 carbon atoms. More detailed specific examples of such a polyalkylene glycol monoalkyl ether include polyethylene glycol monomethyl ether, polyethylene glycol mono-2-ethylhexyl ether, polyethylene glycol monolauryl ether, polypropylene glycol monomethyl ether, polypropylene glycol mono-2-ethylhexyl ether, and polypropylene glycol monolauryl ether, each having a number-average molecular weight of 200 to 5,000.

The reaction of the raw material carbodiimide compound with the polyalkylene glycol monoalkyl ether is required to make isocyanate groups remain in order to further react with a trifunctional polyol after the reaction. For this reason, it is necessary in the above reaction that the equivalent of the isocyanate groups is larger than the equivalent of the hydroxyl groups, and it is preferred that the equivalent ratio of the isocyanate groups to the hydroxyl groups be 2/1. The reaction can usually be carried out under conditions well-known to those skilled in the art, and a tin-based catalyst may be used, if necessary.

The temperature during the reaction is not particularly limited, and from the viewpoint of control of the reaction system and reaction efficiency, the temperature may preferably be 60 to 120° C. In addition, an organic solvent free from active hydrogen may preferably be used in the reaction.

Next, the thus-obtained reaction product is reacted with a trifunctional polyol. The amount of the trifunctional polyol to be used for the reaction may preferably be such an amount that the hydroxyl group equivalent is equal to or larger than the isocyanate equivalent in the reaction product, and more preferably, the isocyanate equivalent is equal to the hydroxyl group equivalent. The isocyanate equivalent in the reaction product not only can be measured directly but also can be determined by calculation from the blending ratio of the diisocyanate compound and the polyalkylene glycol monoalkyl ether in the preceding step. The reaction can be carried out in the same manner as the reaction of the raw material carbodiimide compound with the polyalkylene glycol monoalkyl ether described previously.

The trifunctional polyol may preferably be trimethylolpropane, glycerol, or an alkylene oxide adduct of these because of its easy availability. Examples of the alkylene oxide include ethylene oxide and propylene oxide. An alkylene oxide adduct of glycerol is commercially available from Sanyo Chemical Industries, Ltd. as GP Series. In consideration of the curing reactivity of a three-chain type hydrophilic carbodiimide compound to be obtained, one in which alkylene oxide has been added to every hydroxyl group is particularly preferred. Of the aforementioned GP Series, GP-250 and GP-3000 are mentioned as those having such a structure.

The carbodiimide compound can be obtained through such a two-step reaction. The thus-produced carbodiimide compound does not have only the structure of the formula (1), but is a mixture containing other various reaction products derived from the raw materials used. Generally, however, it may be considered to have the structure of the above formula (1).

The content of the carbodiimide compound contained in the first aqueous base coating composition may preferably be 1 to 8% by mass based on the total resin solid content of the coating film-forming resin. The fact that the amount of the carbodiimide compound is within the above range offers an advantage that excellent water resistance can be obtained in a resulting multilayer coating film.

Melamine Resin

Preferably, the curing agent contained in the coating film-forming resin further contains a melamine resin. The melamine resin is not particularly limited as long as it can cause a curing reaction with the acrylic resin and the hydroxyl group-containing polyester resin contained as an emulsion and can be blended in the first aqueous base coating composition. Specifically, imino-type melamine resins may be preferable, and examples thereof include CYMEL 211 (imino-type melamine resin manufactured by Mitsui Cytec Ltd., trade name) and CYMEL 327 (imino-type melamine resin manufactured by Mitsui Cytec Ltd., trade name).

In addition, alkyl etherified melamine resins, which have been alkyl etherified, may be preferred, and melamine resins substituted with methoxy groups and/or butoxy groups may be more preferred. Examples of such melamine resins include those having only methoxy groups, such as CYMEL 325, CYMEL 327, CYMEL 370, and MYCOAT 723; those having both methoxy and butoxy groups, CYMEL 202, CYMEL 204, CYMEL 232, CYMEL 235, CYMEL 236, CYMEL 238, CYMEL 254, CYMEL 266, and CYMEL 267 (all trade names, manufactured by Mitsui Cytec Ltd.); and those having only butoxy groups, such as MYCOAT 506 (trade name, manufactured by Mitsui Cytec Ltd.), U-VAN 20N60, U-VAN 20SE (both trade names, manufactured by Mitsui Chemicals, Inc.). These may be used singly, or two or more of them may be used in combination.

The solid content of the melamine resin contained in 100 parts by mass of the total resin solid content of the coating film-forming resin may preferably be 10 to 50 parts by mass, and more preferably 10 to 40 parts by mass. The fact that the solid content of the melamine resin is within the above range offers an advantage that the curing reaction occurs sufficiently and the strength, the chipping resistance, and the water resistance of a coating film are improved.

Other Components

The first aqueous base coating composition may contain other components in addition to the above-described components. Examples of such other components include pigments, viscosity agents, film-forming assistants, and additives usually used in coating compositions (for example, UV absorbers, antioxidants, antifoaming agents, surface conditioners, and pinhole inhibitors). Content amounts of them may be within ranges known to those skilled in the art.

The first aqueous base coating composition to be used in the present invention preferably include a pigment. The pigment may preferably be used in the form of a pigment-dispersing paste.

The pigment-dispersing paste is obtained by dispersing a pigment and a pigment dispersant in a small amount of an aqueous medium in advance.

The pigment dispersant is a resin having a structure including a pigment-affinitive part and a hydrophilic part. Examples of the pigment-affinitive part and the hydrophilic part include nonionic, cationic and anionic functional groups. The pigment dispersant may have two or more types of the above-mentioned functional groups in one molecule.

Examples of the nonionic functional group include a hydroxyl group, an amide group, and a polyoxyalkylene group. Examples of the cationic functional group include an amino group, an imino group, and a hydrazino group. Examples of the anionic functional group include a carboxyl group, a sulfonic acid group, and a phosphoric acid group. Such pigment dispersants can be produced by methods well known to those skilled in the art.

The pigment dispersant is not particularly limited as long as it does not contain any volatile basic substance in its solid content or contains a volatile basic substance in a content of 3% by mass or less. Preferred may be a pigment dispersant capable of dispersing a pigment efficiently by a small amount of the pigment dispersant. For example, commercially available products (the following are all trade names) can also be used, and examples thereof include Disperbyk 190, Disperbyk 181, Disperbyk 182 (copolymer), and Disperbyk 184 (copolymer), which are anionic-nonionic dispersants manufactured by BYK-Chemie, EFKAPOLYMER 4550, which is an anionic-nonionic dispersant manufactured by BASF, Solsperse 27000, which is a nonionic dispersant manufactured by Avecia Resins, Solsperse 41000 and Solsperse 53095, which are anionic dispersants.

The number-average molecular weight of the pigment dispersant may preferably be 1000 at its lower limit and 100,000 at its upper limit. The lower limit of the number-average molecular weight may more preferably be 2000, and further preferably 4000. The upper limit of the number-average molecular weight may more preferably be 50,000.

The pigment-dispersing paste can be prepared by mixing and dispersing a pigment dispersant and a pigment according to a known method. The ratio of the pigment dispersant during the production of the pigment-dispersing paste may preferably be 1% by mass at its lower limit and 20% by mass at its upper limit, based on the solid content of the pigment dispersion paste. Thanks to the fact that the proportion of the pigment dispersant is within the above range, pigment dispersion stability and the physical properties of a resulting coating film can be maintained in favorable ranges. The lower limit may more preferably be 5% by mass, and the upper limit may more preferably be 15% by mass.

The pigment is not particularly limited as long as it is a pigment used for a conventional aqueous coating composition, and it may preferably be a coloring pigment in view of improving weather resistance and securing hiding property. In particular, titanium dioxide may be more preferable because it is superior in hiding property of color and is inexpensive.

Examples of pigments other than titanium dioxide include organic coloring pigments such as azo chelate pigments, insoluble azo pigments, condensed azo pigments, phthalocyanine-based pigments, indigo pigments, perinone-based pigments, perylene-based pigments, dioxane-based pigments, quinacridone-based pigments, isoindolinone-based pigments, diketopyrrolopyrrole-based pigments, benzimidazolone-based pigments, and metal complex pigments; and inorganic colored pigments such as chrome yellow, yellow iron oxide, iron oxide red, and carbon black. These pigments may be used in combination with extender pigments such as calcium carbonate, barium sulfate, clay, and talc.

As a pigment, a standard gray coating composition containing carbon black and titanium dioxide as main pigments can also be used. In addition, it is also possible to use a coating composition in combination with the lightness or hue of an upper coating composition and a combination of pigments of various colors.

Preferably, the pigment has a ratio of the mass of the pigment to the total mass of the solid content of the resin and the pigment contained in the first aqueous base coating composition (PWC; pigment weight content) of 10 to 60% by mass. When it is less than 10% by mass, there is a possibility that the hiding property deteriorate. When it exceeds 60% by mass, increase in viscosity at the time of curing is caused, so that the flowability is lowered and the coating film appearance may be deteriorated.

The content of the pigment dispersant may preferably be 0.5% by mass at its lower limit and 10% by mass at its upper limit based on the mass of the pigment. When it is less than 0.5% by mass, the pigment may be inferior in dispersion stability due to the small amount of the pigment dispersant.

When it exceeds 10% by mass, a resulting coating film may be inferior in physical properties. Preferably, the lower limit is 1% by mass and the upper limit is 5% by mass.

The viscosity agent may be, for example, an association type viscosity agent. A content amount of the viscosity agent may preferably be 0 to 10 parts by mass, and more preferably 0.01 to 5 parts by mass, based on 100 parts by mass of the total resin solid content of the coating film-forming resin contained in the first aqueous base coating composition. Thanks to the fact that the viscosity agent is contained in a ratio within such a range, an excellent thickening effect can be obtained and sagging during coating can be suppressed. Furthermore, there is an advantage that a superior appearance and various superior performances of a resulting coating film are attained.

The first aqueous base coating composition can be prepared, for example, by mixing the acrylic resin emulsion, the carbodiimide compound, and a polyester resin, a polyurethane resin, a melamine resin, a film-forming assistant, etc. as necessary.

For example, the ratio of the acrylic resin emulsion to the polyester resin may preferably be a solid content mass ratio of 1/1 to 1/20 (acrylic resin emulsion/hydroxyl group-containing polyester resin). Use in such a ratio offers an advantage that increase in the viscosity of a coating film can be suppressed and excellent smoothness is imparted to the first base coating film, so that a superior coating film appearance can be obtained. Furthermore, there is another advantage that the water absorption rate and the elution rate of a coating film can be reduced.

The pigment-dispersing paste and other additives may be mixed at appropriate amounts. However, an additional resin component may preferably be blended at a proportion of 50 parts by mass or less based on 100 parts by mass of the solid content of all the resins contained in the first aqueous base coating composition. Blending of the resin component in an amount more than 50 parts by mass is undesirable because it may be difficult to achieve a high concentration of the solids in the coating composition.

The first aqueous base coating composition is not particularly limited with respect to its form as long as it is aqueous and, for example, it may be in the form of a water-soluble form, a water-dispersion form, an emulsion form, or the like.

Second Aqueous Base Coating Composition

The second aqueous base coating composition to be used in the method for forming a multilayer coating film contains a coating film-forming resin, which forms a coating film. The second aqueous base coating composition may be, for example, a coating composition that is usually used as a second aqueous base coating composition for automobile bodies. Examples thereof include one containing a coating film-forming resin, a pigment such as a luster pigment, a coloring pigment, and an extender pigment, and additives which are solved or dispersed in an aqueous medium. As the coating film-forming resin, for example, a polyester resin, an acrylic resin, a urethane resin, a carbonate resin, and an epoxy resin can be used. The coating film-forming resin may contain a curing agent. Examples of the curing agent include a melamine resin. As the coating film-forming resin, a combination of an acrylic resin and/or a polyester resin with a melamine resin may be preferable from the viewpoint of pigment dispersibility and workability. As the curing agent, the pigment and the additives, those usually used can be used.

The concentration of the pigment contained in the second aqueous base coating composition (PWC) is generally 1% by mass at its lower limit and 60% by mass at its upper limit, for example, 2% by mass at its lower limit and 55% by mass at its upper limit, and preferably 3% by mass at its lower limit and 55% by mass at its upper limit. When the pigment concentration is less than 1% by mass, the effect of the pigment cannot be obtained. When it exceeds 60% by mass, the appearance of a resulting coating film may be deteriorated.

The second aqueous base coating composition can be prepared by the same method as the first aqueous base coating composition. Further, the second aqueous base coating composition is not particularly limited with respect to its form as long as it is aqueous and, for example, it may be in the form of a water-soluble form, a water-dispersion form, an emulsion form, or the like.

The second aqueous base coating composition preferably contains a scale-like luster pigment. As the scale-like luster pigment, for example, those having an average particle diameter (D50) of 2 to 50 μm and a thickness of 0.1 to 5 μm may be preferable. Those having an average particle diameter in the range of 5 to 35 μm are superior in luminosity and are more suitably used. Examples of the scale-like luster pigment include metallic scale-like luster pigments such as metals or alloys including aluminum, copper, zinc, iron, nickel, tin, and aluminum oxide, and mixtures thereof. In addition, interference mica pigments, white mica pigments, and graphite pigments are included therein. Such scale-like luster pigments may have been colored as necessary.

The average particle diameter of the scale-like luster pigment means the median diameter of the volume-based particle size distribution measured by a laser diffraction scattering method. The thickness of the scale-like luster pigment shall be defined by the average of 100 or more measurements obtained by observing a cross section of a coating film containing the scale-like luster pigment with a microscope and measuring the thickness of the scale-like luster pigment using image processing software.

The method for forming a multilayer coating film is advantageous in that a better technical effect is achieved in an embodiment in which the second aqueous base coating composition contains a scale-like luster pigment.

Clear Coating Composition

The clear coating composition to be used in the method for forming a multilayer coating film is a clear coating composition containing a hydroxyl group-containing acrylic resin (A), a polyisocyanate compound (B), and a polycarbonate diol compound (C).

In the clear coating composition,
the hydroxyl group-containing acrylic resin (A) has a hydroxyl value in the range of 120 to 160 mgKOH/g, and has an acid value in the range of 5 to 10 mgKOH/g,
the hydroxyl group-containing acrylic resin (A) is a solution polymerized body of a monomer mixture containing a (meth)acrylic acid hydroxyl group-containing alkyl ester monomer, and a hydroxyl group-containing alkyl moiety of the (meth)acrylic acid hydroxyl group-containing alkyl ester monomer has 3 or less carbon atoms, and
the ratio of the numbers of moles of the isocyanate functional groups of the polyisocyanate compound (B) and the hydroxyl group functional groups of the hydroxyl group-containing acrylic resin (A) (isocyanate functional groups/hydroxyl group functional groups) is in the range of 1.15 to 1.35.

The clear coating composition may be either a solvent type or an aqueous type. The clear coating composition may preferably be a two-component clear coating composition. Examples of the two-component clear coating composition include a two-component clear coating composition containing a main component containing a hydroxyl group-containing acrylic resin (A) and a polycarbonate diol compound (C), and a curing agent containing a polyisocyanate compound (B).

Hydroxyl Group-Containing Acrylic Resin (A)

The hydroxyl group-containing acrylic resin (A) has a hydroxyl value in the range of 120 to 160 mgKOH/g, and has an acid value in the range of 5 to 10 mgKOH/g.

If the hydroxyl value of the hydroxyl group-containing acrylic resin (A) exceeds 160 mgKOH/g, the appearance of a resulting coating film may be deteriorated. On the other hand, if the hydroxyl value is less than 120 mgKOH/g, the physical performance of a resulting coating film may be deteriorated.

If the acid value of the hydroxyl group-containing acrylic resin (A) is out of the range of 5 to 10 mgKOH/g, it may be difficult to adjust the reactivity with the polyisocyanate compound (B) to an appropriate range, and there is a possibility that the coating film appearance of a resulting multilayer coating film and the physical properties of the coating film may be inferior.

In the clear coating composition, the hydroxyl group-containing acrylic resin (A) is a solution polymerized body of a monomer mixture containing a (meth)acrylic acid hydroxyl group-containing alkyl ester monomer, and a hydroxyl group-containing alkyl moiety of the (meth)acrylic acid hydroxyl group-containing alkyl ester monomer has 3 or less carbon atoms.

The fact that the monomer mixture contains a (meth)acrylic acid hydroxyl group-containing alkyl ester monomer having a hydroxyl group-containing alkyl moiety having 3 or less carbon atoms offers an advantage that the reactivity with the polyisocyanate compound (B) is adjusted to an appropriate range, so that the coating film appearance of a resulting multilayer coating film is excellent.

Examples of the (meth)acrylic acid hydroxyl group-containing alkyl ester monomer having a hydroxyl group-containing alkyl moiety having 3 or less carbon atoms include 2-hydroxyethyl (meth)acrylate, 2-hydroxypropyl (meth)acrylate, and 3-hydroxypropyl (meth)acrylate.

The amount of the (meth)acrylic acid hydroxyl group-containing alkyl ester monomer having a hydroxyl group-containing alkyl moiety having 3 or less carbon atoms contained in the monomer mixture may preferably be in the range of 20 to 60 parts by mass, and more preferably in the range of 30 to 50 parts by mass, based on 100 parts by mass of the monomer mixture.

The monomer mixture may optionally contain a hydroxyl group-containing (meth)acrylic monomer other than the (meth)acrylic acid hydroxyl group-containing alkyl ester monomer having a hydroxyl group-containing alkyl moiety having 3 or less carbon atoms. Examples of such a monomer include: hydroxyalkyl (meth)acrylates such as 4-hydroxybutyl (meth)acrylate and 2-hydroxybutyl (meth)acrylate; PLACCEL FM-1 (trade name, adduct of 2-hydroxyethyl (meth)acrylate and polycaprolactone, manufactured by Daicel Chemical Industries, Ltd.); and polyalkylene glycol mono(meth)acrylates.

The monomer mixture preferably contains another ethylenically unsaturated group-containing monomer in addition to the (meth)acrylic acid hydroxyl group-containing alkyl ester monomer having a hydroxyl group-containing alkyl moiety having 3 or less carbon atoms. Another ethylenically unsaturated group-containing monomer is not particularly limited and examples thereof include alkyl (meth)acrylates such as methyl (meth)acrylate, ethyl (meth)acrylate, propyl (meth)acrylate, n-butyl (meth)acrylate, i-butyl (meth)acrylate, t-butyl acrylate, 2-ethylhexyl (meth)acrylate, and lauryl (meth)acrylate; acid group-containing monomers such as acrylic acid, methacrylic acid, crotonic acid, isocrotonic acid, ethacrylic acid, propylacrylic acid, isopropylacrylic acid, itaconic acid, maleic anhydride, and fumaric acid; aromatic vinyl monomers such as styrene and vinyltoluene; epoxy group-containing monomers such as glycidyl (meth)acrylate; amino group-containing monomers such as dimethylaminoethyl (meth)acrylate and diethylaminoethyl (meth)acrylate; acrylamide-based monomers such as (meth)acrylamide, N-ethyl(meth)acrylamide, N,N-butoxymethyl (meth)acrylamide, and N-methylacrylamide; acrylonitrile, vinyl acetate. These may be used singly, or two or more of them may be used in combination.

The hydroxyl group-containing acrylic resin (A) can be prepared by solution polymerizing the monomer mixture. The solution polymerization can be carried out under conditions usually used in the art.

The hydroxyl group-containing acrylic resin (A) preferably has a number-average molecular weight (Mn) of 1500 to 6000. The fact that the number-average molecular weight is within the above range offers an advantage that excellent workability and excellent curability of a resulting clear coating composition can be secured.

Polyisocyanate Compound (B)

The clear coating composition contains a polyisocyanate compound (B). The polyisocyanate compound (B) may preferably be contained in a curing agent in a two-component clear coating composition. The polyisocyanate compound (B) is not particularly limited as long as it is a polyisocyanate compound used as a curing agent for a coating composition. Typical polyisocyanate compounds include aliphatic polyisocyanates (especially, aliphatic diisocyanates) such as trimethylene diisocyanate, tetramethylene diisocyanate, pentamethylene diisocyanate, hexamethylene diisocyanate (HDI), and trimethylhexamethylene diisocyanate; alicyclic polyisocyanates (especially, alicyclic diisocyanates) such as 1,3-cyclopentane diisocyanate, 1,4-cyclohexane diisocyanate, 1,2-cyclohexane diisocyanate, isophorone diisocyanate (IPDI), and norbornane diisocyanate methyl; aromatic polyisocyanates such as xylylene diisocyanate (XDI), 2,4-tolylene diisocyanate (TDI), and 2,6-tolylene diisocyanate; and isocyanurate compounds, uretdione compounds, urethane compounds, allophanate compounds, biuret compounds, and adducts with trimethylol propane derived therefrom.

The polyisocyanate compound (B) may preferably be at least one species selected from the group consisting of aliphatic diisocyanates, alicyclic diisocyanates, and nurate bodies and uretdione bodies of these diisocyanates. Use of the polyisocyanate compound offers an advantage that a clear coating film superior in weather resistance can be formed and the reaction rate with the hydroxyl group-containing acrylic resin (A) can be well controlled.

In the clear coating composition, the ratio of the numbers of moles of the isocyanate functional groups of the polyisocyanate compound (B) and the hydroxyl group functional groups of the hydroxyl group-containing acrylic resin (A) (isocyanate functional groups/hydroxyl group functional groups) is in the range of 1.15 to 1.35. In the method for forming a multilayer coating film, use of a clear coating composition in which the ratio of the numbers of moles of the isocyanate functional groups to the hydroxyl group functional groups is within the above range makes it possible to keep the orientation especially in the second aqueous base coating film excellent.

Polycarbonate Diol Compound (C)

The clear coating composition contains a polycarbonate diol compound (C). The polycarbonate diol (C) may preferably be one represented by the following formula (2).

[Chemical Formula 6]

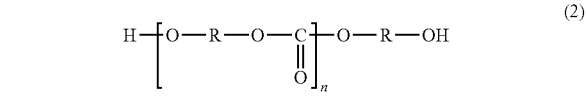

In the formula (2), the structure of R is determined depending on the diol component to be used for the production of the polycarbonate diol. Examples of the diol component include dihydric alcohols having 2 to 10 carbon atoms, preferably 4 to 8 carbon atoms. Examples thereof include aliphatic diols such as 1,2-propanediol, 1,3-propanediol, 1,3-butanediol, 1,4-butanediol, 1,5-pentanediol, 1,6-hexanediol, 1,7-heptanediol, 1,8-octanediol, 2-ethyl-1,6-hexanediol, 2-methyl-1,3-propanediol, 3-methyl-1,5-pentanediol and neopentyl glycol; alicyclic diols such as 1,3-cyclohexanediol, 1,4-cyclohexanediol and 1,4-cyclohexanedimethanol; aromatic diols such as p-xylene diol and p-tetrachloroxylenediol; and diols such as diethylene glycol and dipropylene glycol. These diols can be used singly or two or more species thereof can be used in combination. The polycarbonate diol can be obtained by reacting the diol with a carbonylating agent such as phosgene.

In the polycarbonate diol compound (C), R in the formula (2) may preferably be a linear alkylene group (a linear alkanediyl group). In this case, R in the formula (2) may more preferably be a linear alkylene group (a linear alkanediyl group) having 2 to 40 carbon atoms.

The polycarbonate diol compound (C) may more preferably be a polymer of a diol component containing 1,6-hexanediol and a carbonylating agent. Use of such a polycarbonate diol compound (C) offers an advantage that it is possible to obtain excellent scratch resistance while maintaining durability and hardness.

Particularly preferred aspect may be those in which two or more diol components including 1,6-hexanediol as an essential diol component are used in combination, and examples thereof include polycarbonate diol compounds obtained by polycondensation of a diol component such as a combination of 1,6-hexanediol and 1,5-pentanediol, a combination of 1,6-hexanediol and 1,4-butanediol or a combination of 1,6-hexanediol and 1,4-dimethylolcyclohexane with a carbonylating agent.

Above all, a combination of 1,6-hexanediol and 1,5-pentanediol having a molar ratio of 1,6-hexanediol/1,5-pentanediol of 80/20 to 20/80 may be preferable. As described above, those in which two or more diols are used in combination may be preferable in that wear resistance is excellent.

As the carbonylating agent, for example, one or a combination of two or more of commonly used alkylene carbonate, dialkyl carbonate, diallyl carbonate, and phosgene can be used. Of these, ethylene carbonate, propylene carbonate, dimethyl carbonate, diethyl carbonate, dibutyl carbonate, and diphenyl carbonate may be preferable.

The polycarbonate diol compound (C) preferably has a hydroxyl group equivalent of 320 to 2000, more preferably 350 to 1000. The fact that the hydroxyl group equivalent is within the above range offers an advantage that wear resistance, stain resistance, and water resistance can be kept excellent.

The polycarbonate diol compound (C) preferably has a number-average molecular weight in the range of 500 to 6000.

As the polycarbonate diol, commercially available products can be used. Examples of the commercially available products include DURANOL T-5650J, T-5650E, T-5651, T-5652 (diol component: 1,6-hexanediol and 1,5-pentanediol), and T-4671 (diol component: 1,6-hexanediol and 1,4-butanediol) produced by Asahi Kasei Corp.; and ETERNACOLL UM-90 (1/1, 1/3) (diol components: 1,6-hexanediol and 1,4-dimethylolcyclohexane) produced by Ube Industries, Ltd.

The fact that the clear coating composition contains the hydroxyl group-containing acrylic resin (A) and the polycarbonate diol compound (C), especially the fact that the composition contains the hydroxyl group-containing acrylic resin (A) and the polycarbonate diol compound (C) as main components of a two-component clear coating composition offers an advantage that a self-repairing function that a clear coating film absorbs external force and repairs scratches can be obtained.

The content of the polycarbonate diol compound (C) may preferably be in the range of 0 to 40 parts by weight, and more preferably in the range of 5 to 20 parts by weight, based on 100 parts by weight of the resin solid content of the hydroxyl group-containing acrylic resin (A).

The clear coating composition may further contain a viscosity control agent. The inclusion of the viscosity control agent can improve the coating workability. As the viscosity control agent, one which exhibits thixotropy can generally be used and, for example, those already described in the section of the aqueous base coating composition can be used. Further, if necessary, a curing catalyst, a surface conditioner, etc. may be contained. Furthermore, known ultraviolet absorbers, light stabilizers, antioxidants, etc. may be contained. In addition, known rheology control agents and other surface conditioners may be added, and solvents such as alcohol solvents, aromatic hydrocarbon solvents, ester solvents and ketone solvents may be used for the purpose of viscosity adjustment, etc. These additives can be included in a main component and/or a curing agent.

When the clear coating composition is a two-component clear coating composition, as to the mixing timing of its main component and a curing agent, the main component and the curing agent may be mixed before use and may be applied by a common coating method. Alternatively, application may be carried out by a method in which the respective liquids are sent to a gun with a two-liquid mixing gun and then mixed at a gun tip.

Method for Forming a Multilayer Coating Film

The above-mentioned method for forming a multilayer coating film includes the following steps:

a first aqueous base coating step of forming an uncured first base coating film on an automobile body with an electrodeposited coating film by applying a first aqueous base coating composition such that a dry coating film thickness of 10 to 40 μm is achieved;

a second aqueous base coating step of forming an uncured second base coating film on an uncured coating film obtained by drying, at 60 to 90° C., the uncured first base coating film obtained in the above step by applying a second aqueous base coating composition such that a dry coating film thickness of 5 to 30 μm is achieved;

a clear coating step of heat drying the uncured first base coating film and the uncured second base coating film obtained in the above steps and then forming an uncured clear coating film by applying a clear coating composition such that a dry coating film thickness of 10 to 70 μm is achieved; and a curing step of forming a multilayer coating film composed of a first base coating film, a second base coating film, and a clear coating film by simultaneously heat curing the uncured first base coating film, the uncured second base coating film and the clear coating film obtained in the above steps.

Object to be Coated

The object to be coated that can be used in the above-described coating is an automobile body with an electrodeposited coating film. The automobile body contains a metal substrate. Examples of the metal substrate include metals such as iron, steel, copper, aluminum, tin, and zinc, and alloys containing such metals.

The metal substrate may have been subjected to a chemical conversion treatment (for example, zinc phosphate chemical conversion treatment and zirconium chemical conversion treatment) as necessary before the electrodeposited coating film is formed.

The automobile body may include a plastic substrate part. Examples of the plastic substrate part include polypropylene resin, polycarbonate resin, urethane resin, polyester resin, polystyrene resin, ABS resin, vinyl chloride resin, and polyamide resin.

First Aqueous Base Coating Step

In the first aqueous base coating step, an uncured first base coating film is formed by applying a first aqueous base coating composition onto an automobile body with an electrodeposited coating film, which is an object to be coated, such that a dry coating film thickness of 10 to 40 μm is achieved.

Examples of the coating method to be commonly used in the application of the first aqueous base coating composition include methods commonly used in the field of coating of automobile bodies, such as multi-stage coating or one-stage coating by air electrostatic spray coating, or a coating method in which air electrostatic spray coating is combined with a rotary atomization type electrostatic applicator, which is called a metallic bell. These coating methods have the advantage that the coating film obtained has an excellent coating film appearance. The thickness of the first base coating film to be formed may more preferably be 15 to 40 μm as a dry film thickness.

Second Aqueous Base Coating Step

In the second aqueous base coating step, an uncured second base coating film is formed by applying a second aqueous base coating composition such that a dry coating film thickness of 5 to 30 μm is achieved onto an uncured coating film obtained by drying, at 60 to 90° C., the uncured first base coating film obtained in the first aqueous base coating step.

The drying of the first base coating film, which is performed before the application of the second aqueous base coating composition, is generally referred to as "preheating". The preheating means heat drying an applied coating composition under conditions such as temperature and time where curing does not occur. The drying time may preferably be 1 to 15 minutes. By performing the drying before the application of the second aqueous base coating composition, the orientation in the second aqueous base coating film is improved, so that the coating film appearance of a resulting multilayer coating film can be improved.

Examples of the coating method to be commonly used in the application of the second aqueous base coating composition include methods commonly used in the field of coating of automobile bodies, such as multi-stage coating or one-stage coating by air electrostatic spray coating, or a coating method in which air electrostatic spray coating is combined with a rotary atomization type electrostatic applicator, which is called a metallic bell. These coating methods have the advantage that the coating film obtained has an excellent coating film appearance. The thickness of the second aqueous base coating film to be formed may more preferably be 5 to 25 µm as a dry film thickness.

Clear Coating Step

In the clear coating step, the uncured first base coating film and the uncured second base coating film obtained in the second aqueous base coating step are heat dried and then an uncured clear coating film is formed by applying a clear coating composition such that a dry coating film thickness of 10 to 70 µm is achieved.

The heat drying of the uncured first base coating film and the uncured second base coating film corresponds to preheating. The heat drying may preferably be performed at 60 to 90° C. for 1 to 15 minutes.

The clear coating composition can be applied by a commonly used method depending on the form of the coating composition. Example of the method for applying the clear coating composition include an application method using a rotary atomizing electrostatic coating machine called Microbell. The dry film thickness of a clear coating film to be formed by applying the above-described clear coating composition may preferably be about 20 to about 60 µm. The condition that the dry film thickness is within the above range offers the advantage that the property of concealing irregularities of a base is excellent and the coating workability can be secured well.

Curing Step

In the curing step, a multilayer coating film composed of a first base coating film, a second base coating film, and a clear coating film is formed by simultaneously heat curing the uncured first base coating film, the uncured second base coating film and the uncured clear coating film obtained in the above clear coating step.

The heat curing condition may preferably be set to 80 to 180° C., and more preferably set to 120 to 160° C. The heating time may be arbitrarily set according to the heating temperature and, for example, when the heating temperature is 120° C. to 160° C., the heating time may preferably be 10 to 40 minutes.

The film thickness of the multilayer coating film formed as described above is, for example, in the range of 20 to 300 µm, and preferably in the range of 30 to 250 µm.

In the method for forming a multilayer coating film, thanks to the fact that the carbodiimide compound is contained in the first aqueous base coating composition, the uncured coating film dried after applying the first aqueous base coating composition is cured earlier than the second aqueous base in the following heat curing step. This offers an advantage that the coating film appearance of a resulting multilayer coating film is improved. Moreover, it becomes possible to advance the heat curing without adversely affecting the surface smoothness of the uncured second base coating film formed on the uncured coating film that has been dried after the first aqueous base coating composition is applied. This offers an advantage that when the second base coating film contains a scale-like luster pigment, the orientation of the scale-like luster pigment is maintained, so that a multilayer coating film excellent in the orientation of the scale-like luster pigment can be obtained.

Further, use of the clear coating composition in the method for forming a multilayer coating film offers an advantage that a clear coating film having excellent scratch resistance can be obtained and the smoothness of the clear coating film is improved, so that the coating film appearance of a resulting multilayer coating film is improved. The clear coating composition containing the hydroxyl group-containing acrylic resin and the polyisocyanate compound is generally used as a two-component clear coating composition because it is high in the reactivity between the components. In addition, since the clear coating composition containing the hydroxyl group-containing acrylic resin and the polyisocyanate compound is high in the reactivity between the components, a high crosslinking density is achieved, so that scratch resistance tends to be excellent. On the other hand, experiments revealed that the reactivity between the components in the clear coating film is high and that the coating film appearance of a resulting multilayer coating film tends to be deteriorated especially in wet-on-wet coating. This is presumably because the clear coating film cures earlier than the underlying base coating film. More specifically, that is presumably because when the clear coating film reacts and cures first and then the underlying base coating film cures during heat curing, the coating film appearance of the clear coating film is deteriorated due to volume shrinkage during the curing of the base coating film that occurs after the curing of the clear coating film.

In the method for forming a multilayer coating film, thanks to the use of the first aqueous base coating composition containing the carbodiimide compound, the underlying first base coating film is cured earlier. Furthermore, thanks to the fact that a hydroxyl group-containing alkyl moiety constituting the hydroxyl group-containing acrylic resin (A) contained in the clear coating composition has 3 or less carbon atoms, a hydroxyl value is within the range of 120 to 160 mgKOH/g, and an acid value is within the range of 5 to 10 mg KOH/g, the heat flow property of the clear coating film during heat curing is improved. In addition, the fact that the ratio of the numbers of moles of the isocyanate functional groups and the hydroxyl group functional groups in the clear coating composition (isocyanate functional groups/hydroxyl group functional groups) is in the range of 1.15 to 1.35 offers an advantage that the reactivity with the hydroxyl group-containing acrylic resin (A) having a hydroxyl group-containing alkyl moiety having 3 or less carbon atoms is secured, so that the scratch resistance of the clear coating film is excellent. Thanks to this, a clear coating film having excellent scratch resistance is obtained, and the smoothness of the clear coating film is improved, so that the coating film appearance of a resulting multilayer coating film is improved.

Examples

The present invention will be described hereafter in more detail by way of examples, to which the present invention is not intended to be limited. In the following examples, all designations of "part(s)" and "%" are on a mass basis, unless otherwise stated.

First Aqueous Base Coating Composition

Production Example 1 Production of Hydroxyl Group-Containing Acrylic Resin Emulsion A reaction vessel for the conventional production of an acrylic resin emulsion equipped with a stirrer, a thermometer, a dropping funnel, a reflux condenser, a nitrogen inlet tube, etc., is charged with 445 parts of water and 5 parts of Newcol 293 (manufactured by Nippon Nyukazai Co., Ltd.), which were then heated to 75° C. with stirring.

A mixture of 24.6 parts of a monomer mixture containing 5 parts of styrene, 78.11 parts of 2-ethylhexyl acrylate, 16.25 parts of hydroxyethyl methacrylate and 0.64 parts of acrylic acid, 240 parts of water and 30 parts of Newcol 293 (manufactured by Nippon Nyukazai Co., Ltd.) was emulsified with a homogenizer, and the resulting monomer pre-emulsion was dropped into the reaction vessel over 3 hours with stirring. In parallel with the dropping of the monomer pre-emulsion, an aqueous solution prepared by dissolving 1 part of APS (ammonium persulfate) as a polymerization initiator in 50 parts of water was evenly dropped to the reaction vessel until the dropping of the monomer pre-emulsion was completed. After the completion of the dropping of the monomer pre-emulsion, the reaction was further continued for 1 hour at 80° C., followed by cooling. After the cooling, pH was adjusted by pouring an aqueous solution prepared by dissolving 2 parts of dimethylamino ethanol in 20 parts of water, and thus a hydroxyl group-containing acrylic resin emulsion having a nonvolatile content of 40.6% by mass was obtained.

Production Example 2 Production of Hydroxyl Group-Containing Polyester

To a reactor, 25.6 parts of isophthalic acid, 22.8 parts of phthalic anhydride, 5.6 parts of adipic acid, 19.3 parts of trimethylolpropane, 26.7 parts of neopentyl glycol, 17.5 parts of ε-caprolactone, and 0.1 parts of dibutyltin oxide were added and then heated to 170° C. with mixing and stirring. Thereafter, while the temperature was raised to 220° C. over 3 hours, water produced by the condensation reaction was removed until the acid value reached 8 mgKOH/g. Next, 7.9 parts of trimellitic anhydride was added and reacted at 150° C. for 1 hour, affording a polyester resin having an acid value of 40 mgKOH/g. Furthermore, after cooling to 100° C., 11.2 parts of butyl cellosolve was added and stirred until the mixture became uniform. After cooling to 60° C., 98.8 parts of ion-exchanged water and 5.9 parts of dimethylethanolamine were added, affording a hydroxyl group-containing polyester resin having a solid content of 50% by mass, an acid value of the solid of 40 mgKOH/g, a hydroxyl value of 110 mgKOH/g, a number-average molecular weight of 2870, and a glass transition temperature (Tg) of −3° C.

Production Example 3 Production of Carbodiimide Compound

By reacting 3,930 parts of 4,4-dicyclohexylmethane diisocyanate with 79 parts of 3-methyl-1-phenyl-2-phospholene-1-oxide, which is a carbodiimidization catalyst, at 180° C. for 16 hours, a carbodiimide compound having four carbodiimide groups in one molecule and having isocyanate groups at its both ends was obtained. Here, 1.296 parts of polyethylene glycol monomethyl ether having an average oxyethylene group repeat number of 9 and 2 parts of dibutyltin dilaurate were added, followed by heating at 90° C. for 2 hours, and thus a carbodiimide compound having an isocyanate group and a hydrophilic group at its ends was obtained. Next, 3000 parts of GP-3000 (manufactured by Sanyo Chemical Co., Ltd.) having a structure in which 16.7 mol, in average, of propylene oxide corresponding to the $OR^1$ group was added to respective three hydroxyl groups of glycerin was added and reacted at 90° C. for 6 hours. It was confirmed by IR that isocyanate groups disappeared from the reaction mixture. Deionized water (18,800 parts) was added thereto, followed by stirring, and thus an aqueous dispersion of a carbodiimide compound having a resin solid content of 30% by mass was obtained.

Production Example 4 Production of Pigment-Dispersing Paste

After preliminarily mixing 4.5 parts of a commercially available dispersant "Disperbyk 190" (anionic and nonionic dispersant manufactured by BYK-Chemie, trade name), 0.5 parts of an antifoaming agent "BYK-011" (antifoaming agent manufactured by BYK-Chemie), 22.9 parts of ion-exchanged water, and 72.1 parts of rutile type titanium dioxide, a glass bead medium was added in a paint conditioner, and mixed and dispersed at room temperature until the particle size reached 5 μm or less, and thus a pigment-dispersing paste was obtained.

Clear Coating Composition

Production Example 5 Production of Hydroxyl Group-Containing Acrylic Resin

A vessel equipped with a stirrer, a temperature controller and a reflux condenser was charged with 30 g of butyl acetate, which was then heated to 120° C. Next, a monomer mixture having the following composition (20 parts of styrene, 15.8 parts of n-butyl acrylate, 21.8 parts of n-butyl methacrylate, 41.1 parts of 2-hydroxypropyl methacrylate, and 1.3 parts of acrylic acid), 12 parts of Kayaester O, and 6 parts of butyl acetate were added dropwise simultaneously over 3 hours and then were left for 30 minutes. Then, a solution of 0.5 parts of Kayaester O and 4 parts of butyl acetate was added dropwise over 30 minutes, and the reaction solution was stirred for 1 hour and the rate of change to resin was raised, and then the reaction was terminated. Thus, a hydroxyl group-containing acrylic resin (A-1) having a solid content of 70% by mass, a number-average molecular weight of 3800, a hydroxyl value of 160 mgKOH/g (of which, the ratio of secondary hydroxyl groups was 100%), and an acid value of 10 mgKOH/g was obtained.

Production Examples 6 to 10 Production of Hydroxyl Group-Containing Acrylic Resins (A-2) to (A-6)

Hydroxyl group-containing acrylic resins (A-2) to (A-6) were produced by the same procedure as in Production Example 5, except that the monomer mixture was changed to those shown in the following table.

TABLE 1

| | Production Example 5 | Production Example 6 | Production Example 7 | Production Example 8 | Production Example 9 | Production Example 10 |
|---|---|---|---|---|---|---|
| Hydroxyl group-containing acrylic resin No. | (A-1) | (A-2) | (A-3) | (A-4) | (A-5) | (A-6) |
| Styrene | 20 | 20 | 20 | 20 | 20 | 20 |

TABLE 1-continued

|  | Production Example 5 | Production Example 6 | Production Example 7 | Production Example 8 | Production Example 9 | Production Example 10 |
|---|---|---|---|---|---|---|
| n-Butyl acrylate | 15.8 | 15.5 | 15 | 25 | 15.1 | 7 |
| n-Butyl methacrylate | 21.8 | 22.8 | 32.8 | 17 | 32.5 | 30.6 |
| 2-Hydroxypropyl methacrylate | 41.1 | 41.1 | 30.8 |  | 30.8 |  |
| Acrylic acid | 1.3 | 0.6 | 1.3 | 0.6 | 1.6 | 1.3 |
| 2-Hydroxyethyl acrylate |  |  |  | 37 |  |  |
| 4-Hydroxybutyl acrylate |  |  |  |  |  | 41.1 |
| Hydroxyl value (mgKOH/g) of hydroxyl group-containing acrylic resin | 160 | 160 | 120 | 160 | 160 | 160 |
| Acid value (mgKOH/g) of hydroxyl group-containing acrylic resin | 10 | 5 | 10 | 5 | 12 | 10 |

Example 1

Preparation of First Aqueous Base Coating Composition

After mixing 30 parts by mass of the hydroxyl group-containing acrylic resin emulsion (Em1) prepared in Production Example 1, 10 parts by mass of the hydroxyl group-containing polyester resin prepared in Production Example 2, 25 parts by mass of a polyurethane resin "PERMARIN UA-150" (manufactured by Sanyo Chemical Industries, Ltd., polyether-based urethane emulsion, resin solid content: 30% by mass), 19 parts by mass of a melamine resin "CYMEL 211" (manufactured by Allnex Japan Inc., imino-type melamine resin) as a curing agent, 8 parts by mass of a polycarbonate resin "DURANOL T5650E" (manufactured by Asahi Kasei Corp., polycarbonate diol), 8 parts by mass of the carbodiimide compound prepared in Production Example 3, and 50 parts by mass of the pigment-dispersing paste prepared in Production Example 4, 0.08 parts by mass of ADEKA NOL UH-814N (urethane association type viscosity agent, effective component content: 30%, manufactured by ADEKA Corp.) was mixed and stirred, and thus a first aqueous base coating composition was obtained.

Preparation of Clear Coating Composition

To a 1 L metal container, 245.3 parts of the hydroxyl group-containing acrylic resin (A-1) of Production Example 5, 19.0 parts of DURANOL T-5650E manufactured by Asahi Kasei Corp., 5.6 parts of a UV absorber "Tinuvin 384" manufactured by Ciba Geigy, 5.6 parts of a light stabilizer "Tinuvin 123" manufactured by Ciba Geigy, 5.6 parts of an acrylic surface conditioner, 37.0 parts of toluene, and 37.0 parts of xylene were sequentially added and sufficiently stirred with a disper, and thus a main component of a two-component clear coating composition was obtained.

To another metal container, 100.0 parts of "Desmodur N-3300" (NCO active ingredient content: 22%) manufactured by Sumitomo Bayer Urethane Co., Ltd. and 30 parts of 2-ethylethoxypropanol were sequentially added and sufficiently stirred, and thus a curing agent for a two-component clear coating composition was obtained.

Formation of Multilayer Coating Film

Powernics 1010 (cationic electrodeposition coating composition produced by Nippon Paint Automotive Coatings Co., Ltd., trade name) was electrodeposition coated such that a dry coating film thickness of 15 μm would be achieved on a dull steel sheet treated with zinc phosphate, followed by heat-curing at 170° C. for 30 minutes and subsequent cooling, and thus a steel substrate was prepared.

To the resulting steel substrate, the first aqueous base coating composition prepared as described above was applied in a thickness of 20 μm by air spray coating, followed by preheating at 80° C. for 3 minutes. Next, AQUALEX AR-3020 Silver Metallic (aqueous metallic base coating composition manufactured by Nippon Paint Automotive Coatings Co., Ltd., trade name), which is a second aqueous base coating composition, was applied in a thickness of 10 μm by air spray coating, followed by preheating at 80° C. for 3 minutes.

The first aqueous base coating composition and the second aqueous base coating composition were diluted under the following conditions and then used for coating.

First Aqueous Base Coating Composition
  Thinner: ion-exchanged water
  900 mPa·s/6 rpm/B type viscometer
Second Aqueous Base Coating Composition
  Thinner: ion-exchanged water
  3000 mPa·s/6 rpm/B type viscometer Next, the main component and the curing agent of the two-component clear coating composition prepared as described above were mixed at 2.5/1 (mass ratio (%)), affording a clear coating composition.

The resulting clear coating composition was diluted with a diluent solvent composed of 2-ethylethoxypropanol/xylene=1/1 for 30 seconds (measured at 20° C. using a No. 4 Ford cup). The clear coating composition of the above production example was applied in one stage with "Microbell" such that a dry film thickness of 40 μm would be achieved.

Following the application and leaving at room temperature for 10 minutes, baking was carried out in a drier at 140° C. for 30 minutes, and thus a multilayer coating film was obtained.

Example 2

The preparation of a coating composition and the formation of a multilayer coating film were carried out in the same manner as in Example 1 except that a clear coating composition was prepared using the hydroxyl group-containing acrylic resin (A-2) of Production Example 6 instead of the hydroxyl group-containing acrylic resin (A-1) in the preparation of a clear coating composition.

Example 3

The preparation of a coating composition and the formation of a multilayer coating film were carried out in the same manner as in Example 1, except that a clear coating composition was prepared using the hydroxyl group-containing acrylic resin (A-3) of Production Example 7 instead of the hydroxyl group-containing acrylic resin (A-1) in the preparation of the clear coating composition and that the main component and the curing agent of the two-component clear coating composition were mixed at 2.9/1 (mass ratio (%)).

Example 4

The preparation of a coating composition and the formation of a multilayer coating film were carried out in the same manner as in Example 1, except that the main component and the curing agent of the two-component clear coating composition were mixed at 2.2/1 (mass ratio (%)) in the preparation of the clear coating composition.

Example 5

The preparation of a coating composition and the formation of a multilayer coating film were carried out in the same manner as in Example 1 except that the main component and the curing agent of the two-component clear coating composition were mixed at 2.6/1 (mass ratio (%)) in the preparation of the clear coating composition.

Example 6

The preparation of a coating composition and the formation of a multilayer coating film were carried out in the same manner as in Example 1, except that a clear coating composition was prepared using the hydroxyl group-containing acrylic resin (A-4) of Production Example 8 instead of the hydroxyl group-containing acrylic resin (A-1) in the preparation of the clear coating composition and that the main component and the curing agent of the two-component clear coating composition were mixed at 2.6/1 (mass ratio (%)).

Comparative Example 1

The preparation of a coating composition and the formation of a multilayer coating film were carried out in the same manner as in Example 1 except that no carbodiimide compound was used in the preparation of the first aqueous base coating composition.

Comparative Example 2

The preparation of a coating composition and the formation of a multilayer coating film were carried out in the same manner as in Example 1 except that a clear coating composition was prepared using the hydroxyl group-containing acrylic resin (A-5) of Production Example 9 instead of the hydroxyl group-containing acrylic resin (A-1) in the preparation of a clear coating composition.

Comparative Example 3

The preparation of a coating composition and the formation of a multilayer coating film were carried out in the same manner as in Example 1 except that the main component and the curing agent of the two-component clear coating composition were mixed at 2.9/1 (mass ratio (%)) in the preparation of the clear coating composition.

Comparative Example 4

The preparation of a coating composition and the formation of a multilayer coating film were carried out in the same manner as in Example 1 except that the main component and the curing agent of the two-component clear coating composition were mixed at 2.1/1 (mass ratio (%)) in the preparation of the clear coating composition.

Comparative Example 5

The preparation of a coating composition and the formation of a multilayer coating film were carried out in the same manner as in Example 1, except that a clear coating composition was prepared using the hydroxyl group-containing acrylic resin (A-6) of Production Example 10 instead of the hydroxyl group-containing acrylic resin (A-1) in the preparation of the clear coating composition and that the main component and the curing agent of the two-component clear coating composition were mixed at 2.1/1 (mass ratio (%)).

The multilayer coating films obtained in the above examples and comparative examples were subjected to the following evaluations. The results of the evaluations are shown in the following table.

Evaluation of Appearance (LW) of Multilayer Coating Film

As for the finished appearance of the multilayer coating films obtained in Examples and Comparative Examples, LW (measurement wavelength: 1,300 to 12,000 μm) was measured using Wave Scan (manufactured by BYK Gardner). A smaller value indicates a better appearance of a coating film.

Flip-flop (FF) Property

The multilayer coating films obtained in Examples and Comparative Examples were irradiated with a light source from an angle of 45 degrees from the vertical position, and an L* value received at an angle of 25 degrees from the light source irradiation position (L25) was measured. Similarly, an L* value received at an angle of 75 degrees from the light source irradiation position (L75) was measured.

L25/L75 was calculated using the obtained measured values, and the flip-flop property was evaluated. The higher the value (L25/L75), the stronger the flip-flop property.

Evaluation of Scratch Resistance

The evaluation was carried out by the testing method in accordance with ISO 20566 using a car wash tester.

The 20° luster value of a test plate before the evaluation test was measured. A test liquid (containing 1.5 g of silica powder with respect to 1 L of aqueous solution) was placed in a car wash tester and stirred in a feed water container. The test liquid was applied to a brush by reciprocating the test liquid 10 times while spraying it. A test plate was placed on the test table and the test liquid was reciprocated 10 times while spraying it, and then the test plate was taken out and washed with water. Thereafter, water was wiped off and a fast-drying solvent was soaked into flannel, and the test plate was wiped until the flannel was no longer soiled. 20° luster value was measured and a GR (%) luster retention was determined. Higher values of luster retention indicate better car wash scratch resistance (scratch resistance).

TABLE 2

|  |  | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|---|
| First aqueous base coating composition | Presence or absence of carbodiimide compound | ○ | ○ | ○ | ○ | ○ | ○ | × | ○ | ○ | ○ | ○ |
| Clear coating composition | Hydroxyl value (mgKOH/g) of hydroxyl group-containing acrylic resin (A) | 160 | 160 | 120 | 160 | 160 | 160 | 160 | 160 | 160 | 160 | 160 |
|  | Acid value (mgKOH/g) of hydroxyl group-containing acrylic resin (A) | 10 | 5 | 10 | 10 | 10 | 5 | 10 | 12 | 10 | 10 | 10 |
|  | Number of carbon atoms of hydroxyl group-containing alkyl moiety | 3 | 3 | 3 | 3 | 3 | 2 | 3 | 3 | 3 | 3 | 4 |
|  | Molar ratio (isocyanate functional group/hydroxyl group functional group) | 1.2 | 1.2 | 1.2 | 1.35 | 1.15 | 1.15 | 1.2 | 1.2 | 1.0 | 1.4 | 1.4 |
| Evaluation of multilayer coating film | Appearance LW | 10 | 7 | 9 | 7 | 6 | 6 | 15 | 15 | 16 | 7 | 15 |
|  | Flip-flop | 2.2 | 2 | 2 | 2 | 2 | 2 | 1.8 | 2.3 | 2.3 | 1.6 | 1.8 |
|  | Scratch resistance (GR %) | 88 | 86 | 86 | 86 | 88 | 84 | 87 | 89 | 85 | 88 | 88 |

It was confirmed that all of the multilayer coating films obtained in the Examples were excellent in coating film appearance and flip-flop property and were high in scratch resistance.

Comparative Example 1 is an example in which the first aqueous base coating composition contains no carbodiimide compound. The multilayer coating film obtained in this comparative example was confirmed to be inferior in coating film appearance and flip-flop property.

Comparative Example 2 is an example in which the acid value of the hydroxyl group-containing acrylic resin (A) contained in the clear coating composition exceeds 10 mgKOH/g. The multilayer coating film obtained in this comparative example was confirmed to be inferior in coating film appearance.

Comparative Example 3 is an example in which the ratio of the number of moles of the isocyanate functional groups to the number of moles of the hydroxyl group functional groups in the clear coating composition is less than 1.15. The multilayer coating film obtained in this comparative example was confirmed to be inferior in coating film appearance.

Comparative Example 4 is an example in which the ratio of the number of moles of the isocyanate functional groups to the number of moles of the hydroxyl group functional groups in the clear coating composition exceeds 1.35. The multilayer coating film obtained in this comparative example was confirmed to be inferior in flip-flop property.

Comparative Example 5 is an example in which a hydroxyl group-containing alkyl moiety constituting the hydroxyl group-containing acrylic resin (A) contained in the clear coating composition has more than 3 carbon atoms. The multilayer coating film obtained in this comparative example was confirmed to be inferior in flip-flop property.

The multilayer coating film formed by the above-described method for forming a multilayer coating film has an excellent coating film appearance and further has excellent scratch resistance. The method for forming a multilayer coating film of the present invention can be particularly suitably used in, for example, coating of automobile bodies.

What is claimed is:

1. A method for forming a multilayer coating film, the method comprising:
    a first aqueous base coating step of forming an uncured first base coating film on an automobile body with an electrodeposited coating film by applying a first aqueous base coating, composition such that a dry coating film thickness of 10 to 40 μm is achieved;
    a second aqueous base coating step of forming an uncured second base coating film on an uncured coating film obtained by drying, at 60 to 90° C., the uncured first base coating film obtained in the above step by applying a second aqueous base coating composition such that a dry coating film thickness of 5 to 30 μm is achieved;
    a clear coating step of heat drying the uncured first base coating film and the uncured second base coating film obtained in the above steps and then forming an uncured clear coating film by applying a clear coating composition such that a dry coating film thickness of 10 to 70 μm is achieved; and
    a curing step of forming a multilayer coating film composed of a first base coating film, a second base coating film, and a clear coating film by simultaneously heat curing the uncured first base coating film, the uncured second base coating film and the uncured clear coating film obtained in the above steps, wherein the first aqueous base coating composition contains a carbodiimide compound represented, by following formula (1),

[Chemical Formula 1]

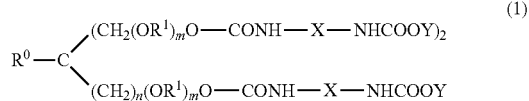

(1)

in formula (1),

X each independently represents a bifunctional organic group containing at least one carbodiimide group, Y each independently represents a structure obtained by removing a hydroxyl group from a polyalkylene glycol monoalkyl ether, $R^0$ represents hydrogen or an alkyl group having 2 or less carbon atoms, $R^1$ each independently represents an alkylene group having 4 or less carbon atoms, m each independently represents a number of 11 or more, n represents 0 or 1, and a repeat number of the oxyalkylene groups in the polyalkylene glycol monoalkyl ether is 6 to 40, wherein the clear coating composition is a clear coating composition containing a hydroxyl group-containing acrylic resin (A), a polyisocyanate compound (B) and a polycarbonate diol compound (C), the hydroxyl group-containing acrylic resin (A) has a hydroxyl value in a range of 120 to 160 mgKOH/g, and has an acid value in a range of 5 to 10 mgKOH/g, the hydroxyl group-containing acrylic resin (A) is a solution polymerized body of a monomer mixture containing a (meth)acrylic acid hydroxyl group-containing alkyl ester monomer, and a hydroxyl group-containing alkyl moiety of the (meth)acrylic acid hydroxyl group-containing alkyl ester monomer has 3 or less carbon atoms, and a ratio of numbers of moles of isocyanate functional groups of the polyisocyanate compound (B) and hydroxyl group functional groups of the hydroxyl group-containing acrylic resin (A) (isocyanate functional groups/hydroxyl group functional groups) is in a range of 1.15 to 1.35.

2. The method according to claim 1, wherein the second aqueous base coating composition contains a scale-like luster pigment.

3. The method according to claim 1, wherein the polyisocyanate compound (B) is at least one species selected from the group consisting of aliphatic diisocyanates, alicyclic diisocyanates, and nurate bodies and uretdione bodies of these diisocyanates.

4. The method according to claim 2, wherein the polyisocyanate compound (B) is at least one species selected from the group consisting of aliphatic diisocyanates, alicyclic diisocyanates, and nurate bodies and uretdione bodies of these diisocyanates.

* * * * *